US012750784B2

(12) United States Patent
Höglund et al.

(10) Patent No.: US 12,750,784 B2
(45) Date of Patent: Sep. 29, 2026

(54) SIGNALING OPTIMIZATIONS FOR WIRELESS DEVICES OPERATING ON HARVESTED ENERGY

(71) Applicant: Telefonaktiebolaget LM Ericsson (publ), Stockholm (SE)

(72) Inventors: Andreas Höglund, Solna (SE); Qian Chen, Mölndal (SE); Mattias Bergström, Sollentuna (SE); Tuomas Tirronen, Helsinki (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 325 days.

(21) Appl. No.: 18/568,954

(22) PCT Filed: Jun. 13, 2022

(86) PCT No.: PCT/SE2022/050579
§ 371 (c)(1),
(2) Date: Dec. 11, 2023

(87) PCT Pub. No.: WO2022/265565
PCT Pub. Date: Dec. 22, 2022

(65) Prior Publication Data
US 2024/0292335 A1 Aug. 29, 2024

Related U.S. Application Data

(60) Provisional application No. 63/210,339, filed on Jun. 14, 2021.

(51) Int. Cl.
*H04W 52/02* (2009.01)

(52) U.S. Cl.
CPC ................................ *H04W 52/0261* (2013.01)

(58) Field of Classification Search
None
See application file for complete search history.

(56) References Cited

U.S. PATENT DOCUMENTS

2015/0201342 A1 7/2015 Vannithamby
2022/0312315 A1* 9/2022 Xu .......................... H02J 50/20
2022/0346022 A1* 10/2022 Butt .................... H04W 52/028
2022/0352751 A1* 11/2022 Elshafie .................. H02J 50/23
2022/0385104 A1* 12/2022 Elshafie .................. H02J 50/20
(Continued)

FOREIGN PATENT DOCUMENTS

WO 2020131813 A1 6/2020

OTHER PUBLICATIONS

International Search Report and Written Opinion dated Sep. 5, 2022 for International Application No. PCT/SE2022/050579 filed Jun. 13, 2022; consisting of 10 pages.
(Continued)

*Primary Examiner* — Anh Vu H Ly
(74) *Attorney, Agent, or Firm* — Weisberg I.P. Law, P.A.

(57) ABSTRACT

A method, system and apparatus are disclosed. According to one or more embodiments, a core node for communication with a wireless device and a network node is provided, where the core node includes processing circuitry configured to receive a first indication that the wireless device is an energy harvesting device, and modify a network procedure based at least on the first indication.

16 Claims, 11 Drawing Sheets

(56) References Cited

U.S. PATENT DOCUMENTS

| | | | | |
|---|---|---|---|---|
| 2023/0057994 | A1* | 2/2023 | Elkotby ............ | H04B 7/06952 |
| 2024/0276376 | A1* | 8/2024 | Kadan Veedu ... | H04W 52/0229 |

OTHER PUBLICATIONS

3GPP TSG RAN Rel-18 workshop RWS-210314, Title: New WID on enhanced support of reduced capability NR devices, Source: Ericsson, Document for: Discussion, Agenda Item: 4.2, Date and Location: Jun. 28-Jul. 2, 2021, Electronic Meeting, consisting of 5 pages.

3GPP TSG RAN Meeting #91e RP-210918, Revision of RP-210894, Title: Revised WID on support of reduced capability NR devices, Source: Nokia, Ericsson, Document for: Approval, Agenda Item: 9.7.27, Date and Location: Mar. 22-26, 2021, Electronic Meeting, consisting of 6 pages.

3GPP TR 38.875 V17.0.0; 3rd Generation Partnership Project; Technical Specification Group Radio Access Network; Study on support of reduced capability NR devices (Release 17); Mar. 2021; consisting of 135 pages.

3GPP TS 36.331 V16.4.0; 3rd Generation Partnership Project; Technical Specification Group Radio Access Network; Evolved Universal Terrestrial Radio Access (E-UTRA); Radio Resource Control (RRC); Protocol specification (Release 16); Mar. 2021; consisting of 1087 pages.

3GPP TS 36.306 V16.4.0; 3rd Generation Partnership Project; Technical Specification Group Radio Access Network; Evolved Universal Terrestrial Radio Access (E-UTRA); User Equipment (UE) radio access capabilities (Release 16); Mar. 2021; consisting of 146 pages.

3GPP TS 38.300 V16.5.0; 3rd Generation Partnership Project; Technical Specification Group Radio Access Network; NR; NR and NG-RAN Overall Description; Stage 2 (Release 16); Mar. 2021; consisting of 151 pages.

3GPP TS 23.501 V17.0.0; 3rd Generation Partnership Project; Technical Specification Group Services and System Aspects; System architecture for the 5G System (5GS); Stage 2 (Release 17); Mar. 2021; consisting of 489 pages.

3GPP TS 23.502 V17.0.0; 3rd Generation Partnership Project; Technical Specification Group Services and System Aspects; Procedures for the 5G System (5GS); Stage 2 (Release 17); Mar. 2021; consisting of 646 pages.

3GPP TS24.501 V17.0.0; 3rd Generation Partnership Project; Technical Specification Group Core Network and Terminals; Non-Access-Stratum (NAS) protocol for 5G System (5GS): Stage 3; (Release 17); Sep. 2020; consisting of 728 pages.

* cited by examiner

SIGNALING OPTIMIZATIONS FOR WIRELESS DEVICES OPERATING ON HARVESTED ENERGY

CROSS-REFERENCE TO RELATED APPLICATIONS

This application is a Submission Under 35 U.S.C. § 371 for U.S. National Stage Patent Application of International Application No.: PCT/SE2022/050579, filed Jun. 13, 2022 entitled "SIGNALING OPTIMIZATIONS FOR WIRELESS DEVICES OPERATING ON HARVESTED ENERGY," which claims priority to U.S. Provisional Application No. 63/210,339, filed Jun. 14, 2021, entitled "SIGNALING OPTIMIZATIONS FOR UES OPERATING ON HARVESTED ENERGY," the entireties of both of which are incorporated herein by reference.

TECHNICAL FIELD

The present disclosure relates to wireless communications, and in particular, to procedure and/or signaling modification associated with wireless devices operating on harvested energy.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

The next paradigm shift in processing and manufacturing is the Industry 4.0 in which factories are automated and made much more flexible and dynamic with the help of wireless connectivity. This includes real-time control of robots and machines using time-critical machine-type communication (cMTC) and improved observability, control, and error detection with the help of large numbers of more simple actuators and sensors (massive machine-type communication or mMTC). For cMTC support, URLLC (ultra-reliable low-latency communication) was introduced in 3GPP Release 15 (Rel 15) for both LTE (Long-Term Evolution) and NR (New Radio), and NR URLLC is further enhanced in 3GPP Release 16 within the enhanced URLLC (eURLLC) and Industrial Internet of Things (IoT) work items.

For mMTC and low power wide area (LPWA) support, 3GPP introduced both Narrowband Internet-of-Things (NB-IoT) and Long-Term Evolution for Machine-Type Communications (LTE-MTC, or LTE-M) in 3GPP Release 13. These technologies have been further enhanced through releases up until and including the ongoing 3GPP Release 17 work.

NR was introduced in 3GPP Release 15 and focused on the enhanced mobile broadband (eMBB) and cMTC. However, there are still several other use cases whose requirements are higher than those of LPWA networks (i.e., LTE-M/NB-IoT) but lower than those of URLLC and eMBB. In order to support such use cases which are in-between eMBB, URLLC, and mMTC, 3GPP has studied reduced capability NR devices (RedCap) in Release 17 (i.e., 3GPP Technical Reference 38.875 v.17.0.0). The RedCap study item in 3GPP was performed, i.e., RP-210918, "Revised WID on support of reduced capability NR devices", Nokia and Ericsson, 3GPP TSG RAN #91e. A corresponding RedCap work item was started and is expected to be finalized in September 2022. The RedCap wireless devices (i.e., user equipments (UEs)) should have lower cost, lower complexity, a longer battery life and potentially a smaller form factor than legacy NR wireless device. Therefore, in 3GPP Rel 17, different complexity reduction features, such as reduced maximum wireless device bandwidth, reduced minimum number of receiver branches, reduced maximum number of downlink (DL) Multiple-Input Multiple-Output (MIMO) layers, relaxed downlink modulation order, and support of half-duplex FDD operation may be specified for RedCap wireless devices.

The discussion on potential enhancements for RedCap in 3GPP Rel 18 are ongoing in 3GPP. One of the potential enhancements is related to support of RedCap wireless devices operating on harvested energy. The energy harvesting wireless devices are getting more attention as they can be self-sufficient, "green" and environmentally friendly, and ideally able to perpetually perform operations. The source of the harvested energy may be, for example, vibration, radio waves, indoor office light, etc. A typical characteristic of energy harvesting wireless devices is that the amount of energy that is available to communicate with the network is often varying drastically over time and is more stochastic.

In general, the harvested energy cannot be used directly by wireless device in that the wireless device may need to accumulate enough energy to perform an operation, e.g., a wireless transmission. Therefore, energy harvesting wireless devices need rechargeable batteries or capacitors that can make the storage and management of the energy possible.

The capability of the energy harvesting wireless devices may vary depending on several factors, such as the energy harvesting technology, the environment where the wireless device is deployed in, the maximum amount of stored energy, the needed charging time and the form-factor of the wireless device, the signal strength in case of radio frequency (RF) harvesting, the efficiency of the harvester, the sensitivity of the harvester (i.e., the minimum power required to harvest energy), etc.

Power Saving Mode (PSM) and Mobile Initiated Communication Only (MICO)

Power-saving mode (PSM) was introduced in LTE 3GPP Rel 12 and is a feature which can provide extended battery life for wireless devices with infrequent data exchange and no need for quick downlink reachability. PSM works by, for most of the time keeping, having the UE logical in a power efficient sub-state associated with radio resource control (RRC)_IDLE in which all AS functionality is switched off (i.e., deep sleep and almost power-off but no re-attach needed). After a connection, the wireless device is sent to this power saving state after a certain time in RRC_IDLE mode, controlled by the configurable parameter the active time (Timmer T3324), and the wireless device will return from this state either upon UL data transmission or periodic TAU (i.e., tracking area update) (Timer T3412). This is illustrated in the example of FIG. 1. That is, the wireless device is in sleep state most of the time, but it will be reachable in the downlink by the network node either after uplink initiated transmission during a time window (the active time T3324), or periodically with the time interval T3412 of the periodic traffic area update (TAU) (i.e., this periodic "keep-alive" uplink control signaling provides the same time window for downlink reachability even if there are no mobile originated uplink transmissions).

For NR, a very similar feature to PSM is implemented and is referred to as Mobile Initiated Communication Only (MICO), which is basically the same concept as PSM with some additional options. MICO is a CN feature described in in 3GPP Technical Specification (TS) 23.501 (e.g., v17.0.0) (SA2) and in 3GPP TS 24.501 (CT1). The wireless device can indicate a preference to use MICO mode during registration, and the application management function (AMF) can configure the use of MICO mode by MICO indication IE (i.e., NAS negotiation).

MICO is similar to PSM but is triggered by 'Periodic registration timer' (Timer T3512) instead of periodic TAU timer (Timer T3412). T3512 is therefore used for DL reachability. The periodic registration timer (T3512) is stopped and restarted when the wireless device enter a CM-CONNECTED state/mode. The 'Periodic Registration Timer' (T3512), and 'Active Time' (3324), can take values from 2 s to 310 h (~13 days). FIG. 2 is a diagram of an example MICO timing.

Currently, there is currently no awareness in core network (CN) that the wireless device is operating on harvested energy, i.e., is a harvested energy wireless device. This could lead to problems with respect to, for example, downlink reachability since the wireless device may actually be energy depleted and unreachable when CN would think the wireless device is reachable, thereby creating various issues such as missed signaling, wasted resources, etc.

SUMMARY

Some embodiments advantageously provide methods, systems, and apparatuses for procedure and/or signaling modification associated with wireless devices operating on harvested energy.

In one or more embodiments, signaling is introduced to inform the CN (e.g., core node) that the wireless device is operating using energy harvesting. Based on this CN awareness, modified CN procedures are provided which can be applied to ensure proper operation of energy harvesting wireless devices in the network, e.g., on when the wireless device is expected to be available for downlink transmission, and how long time the wireless device can be expected to be unavailable before energy storage has been restored to a certain level, etc.

According to one aspect of the present disclosure, a core node for communication with a wireless device and a network node is provided, where the core node includes processing circuitry configured to receive a first indication that the wireless device is an energy harvesting device, and modify a network procedure based at least on the first indication.

According to another aspect of the present disclosure, a method implemented in a core node for communication with a wireless device and a network node is provided. A first indication is received indicating that the wireless device is an energy harvesting device. A network procedure is modified based at least on the first indication.

According to another aspect of the present disclosure, a network node for communication with a core node and a wireless device is provided. The network node includes processing circuitry configured to receive information from the wireless device indicating that the wireless device is an energy harvesting device, cause transmission of a first indication to the core node, where the first indication is based on the received information and configured to cause the core node to modify a network procedure, receive a first instruction from the core node, where the first instruction is based on the modified network procedure and the first indication, and implement the first instruction.

According to another aspect of the present disclosure, a method implemented in a network node for communication with a core node and a wireless device is provided. Information is received from the wireless device indicating that the wireless device is an energy harvesting device. A first indication is transmitted to the core node, where the first indication is based on the received information and configured to cause the core node to modify a network procedure. A first instruction is received from the core node, where the first instruction is based on the modified network procedure and the first indication. The first instruction is implemented.

According to another aspect of the present disclosure, a wireless device for communication with a core node and a network node is provided. The wireless device includes processing circuitry configured to cause transmission of a first indication to the core node or to the network node indicating that the wireless device is an energy harvesting device, where the first indication is configured to cause a modification of a network procedure, and to perform at least one operation in accordance with the modified network procedure.

According to another aspect of the present disclosure, a method implemented in a wireless device for communication with a core node and a network node is provided. A first indication is transmitted to the core node and/or to the network node indicating that the wireless device is an energy harvesting device. The first indication is configured to cause a modification of a network procedure. At least one operation is performed in accordance with the modified network procedure.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
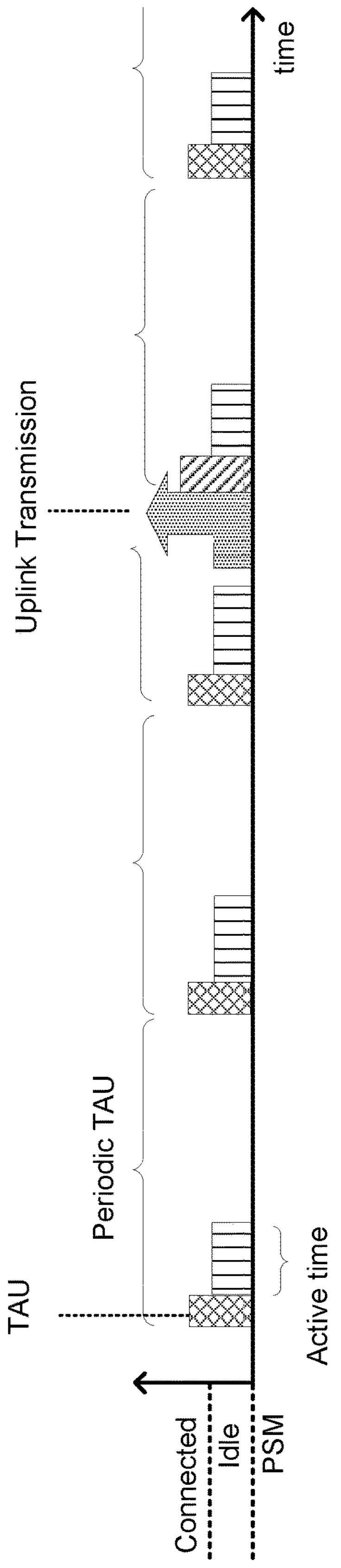
FIG. 1 is a diagram of a power-saving mode.
Figure 2:
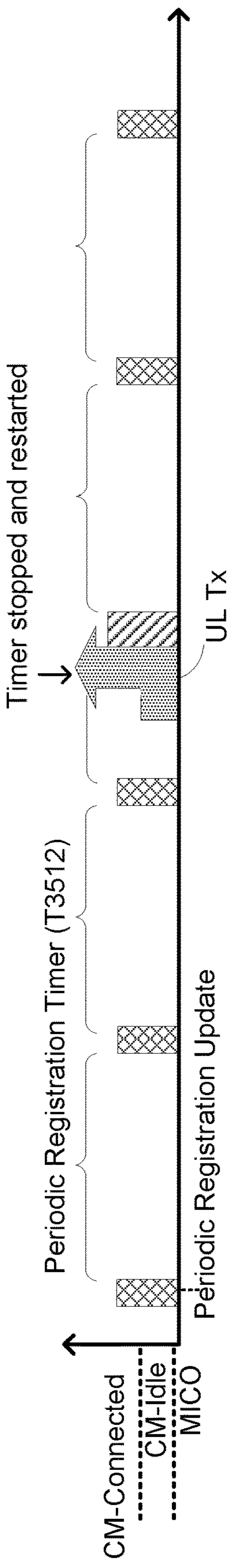
FIG. 2 is a diagram of an example of MICO timing.

Based, for example, on the considerations described above, core network (CN) changes may be needed to properly support such wireless devices in 5G and beyond networks. One or more embodiments of the present disclosure may help solve this issue with existing systems by providing procedures and/or signaling modifications associated with wireless devices operating on harvested energy.

Before describing in detail example embodiments, it is noted that the embodiments reside primarily in combinations of apparatus components and processing steps related to procedure and/or signaling modification associated with wireless devices operating on harvested energy. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term “coupled,” “connected,” and the like, may be used herein to indicate a connection, although not necessarily directly, and may include wired and/or wireless connections.

The term “network node” used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term “radio node” used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

Also, in some embodiments the generic term “radio network node” is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide procedure and/or signaling modification associated with wireless devices operating on harvested energy.

Figure 3:
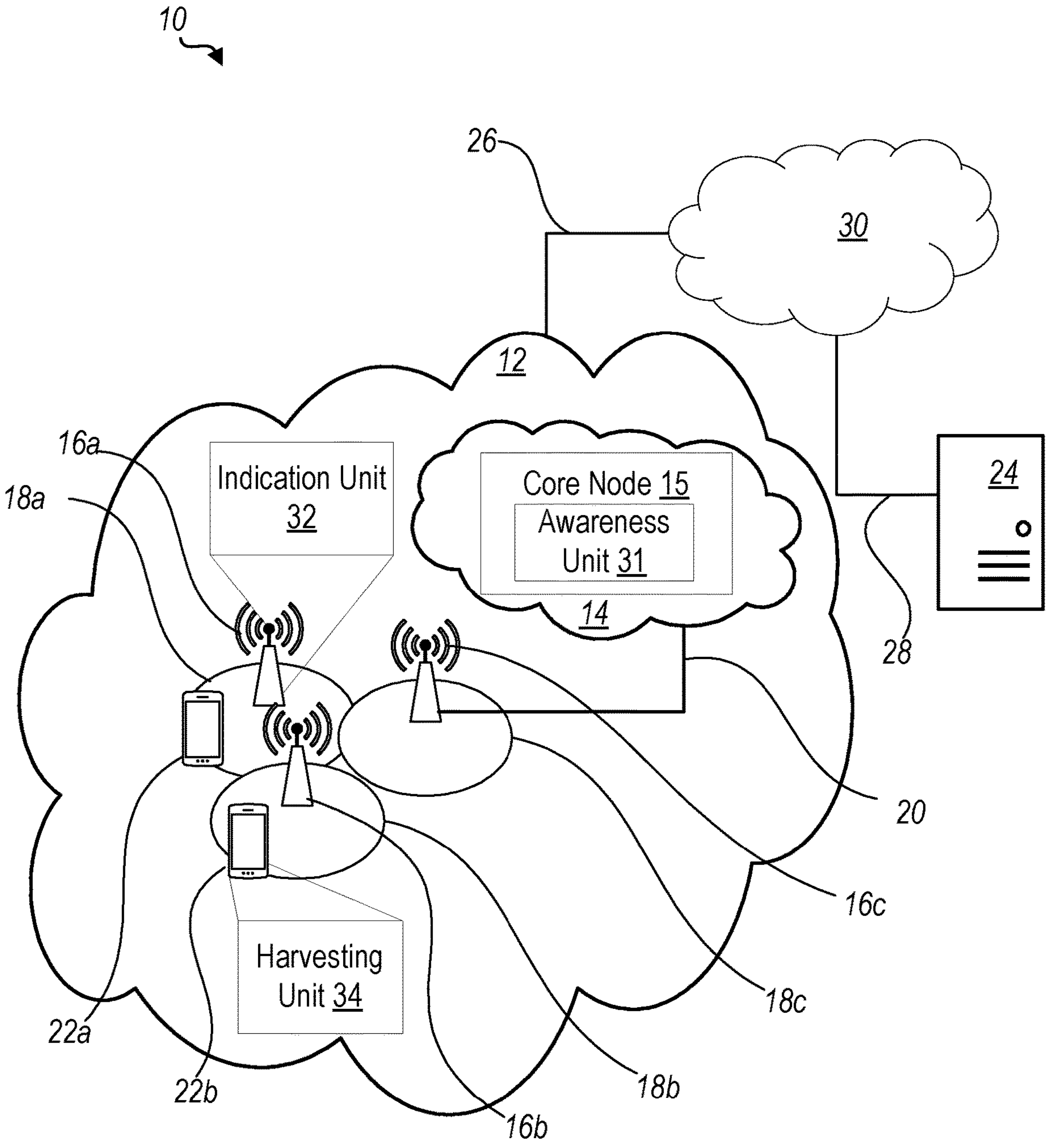
FIG. 3 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14 including one or more core nodes 15 (collectively referred to as core node 15). In one example, core node 15 may corresponds to an application management function (AMF) node. In other examples, core node 15 may corresponds to one or more other core network entities known in the art, but as modified as described herein. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A core node 15 is configured with awareness unit 31 which is configured to perform one or more core node 15 functions as described herein such as with respect to a procedure and/or signaling modification associated with wireless devices 22 operating on harvested energy. A network node 16 is configured to include an indication unit 32 which is configured to perform one or more network node 16 functions as described herein such as with respect to procedure and/or signaling modification associated with wireless devices operating on harvested energy. A wireless device 22 is configured to include a harvesting unit 34 which is configured to perform one or more wireless device 22 functions as described herein such as with respect to procedure and/or signaling modification associated with wireless devices operating on harvested energy.

Example implementations, in accordance with an embodiment, of the core node 15, WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to analyze, store, determine, analyze, forward, relay, transmit, receive, determine, etc. information related to procedure and/or signaling modification associated with wireless devices 22 operating on harvested energy.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10. Further, communication interface 60 may be configured to facilitate a connection 66 to core node 15.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indication unit 32 configured to perform one or more network node 16 functions as described herein such as with respect to procedure and/or signaling modification associated with wireless devices operating on harvested energy.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a harvesting unit 34 configured to perform one or more wireless device 22 functions as described herein such as with respect to procedure and/or signaling modification associated with wireless devices operating on harvested energy.

The communication system 10 further includes a core node 15 provided in a communication system 10 and including hardware 94 enabling it to communicate with one or more of the host computer 24, network node 16 and with the WD 22, via network node 16. The hardware 94 may include a communication interface 96 for setting up and maintaining a connection with an interface of a different communication device of the communication system 10. In one or more embodiments, communication interface includes one or more RF transmitters, one or more RF receivers, and/or one or more RF transceivers.

In the embodiment shown, the hardware 94 of the network node 16 further includes processing circuitry 98. The processing circuitry 98 may include a processor 100 and a memory 102. In particular, in addition to or instead of a processor, such as a central processing unit, and memory, the processing circuitry 98 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 100 may be configured to access (e.g., write to and/or read from) the memory 102, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the core node 15 further has software 104 stored internally in, for example, memory 102, or stored in external memory (e.g., database, storage array, network storage device, etc.) accessible by the core node 15 via an external connection. The software 104 may be executable by the processing circuitry 98. The processing circuitry 98 may be configured to control any of the methods and/or processes described herein and/or to cause such methods, and/or processes to be performed, e.g., by core node 15. Processor 100 corresponds to one or more processors 100 for performing core node 15 functions described herein. The memory 102 is configured to store data, programmatic software code and/or other information described herein. In some embodiments, the software 104 may include instructions that, when executed by the processor 100 and/or processing circuitry 98, causes the processor 100 and/or processing circuitry 98 to perform the processes described herein with respect to core node 15. For example, processing circuitry 98 of core node 15 may include awareness unit 31 configured to perform one or more core node 15 functions as described herein such as with respect to procedure and/or signaling modification associated with wireless devices 22 operating on harvested energy.

Figure 4:
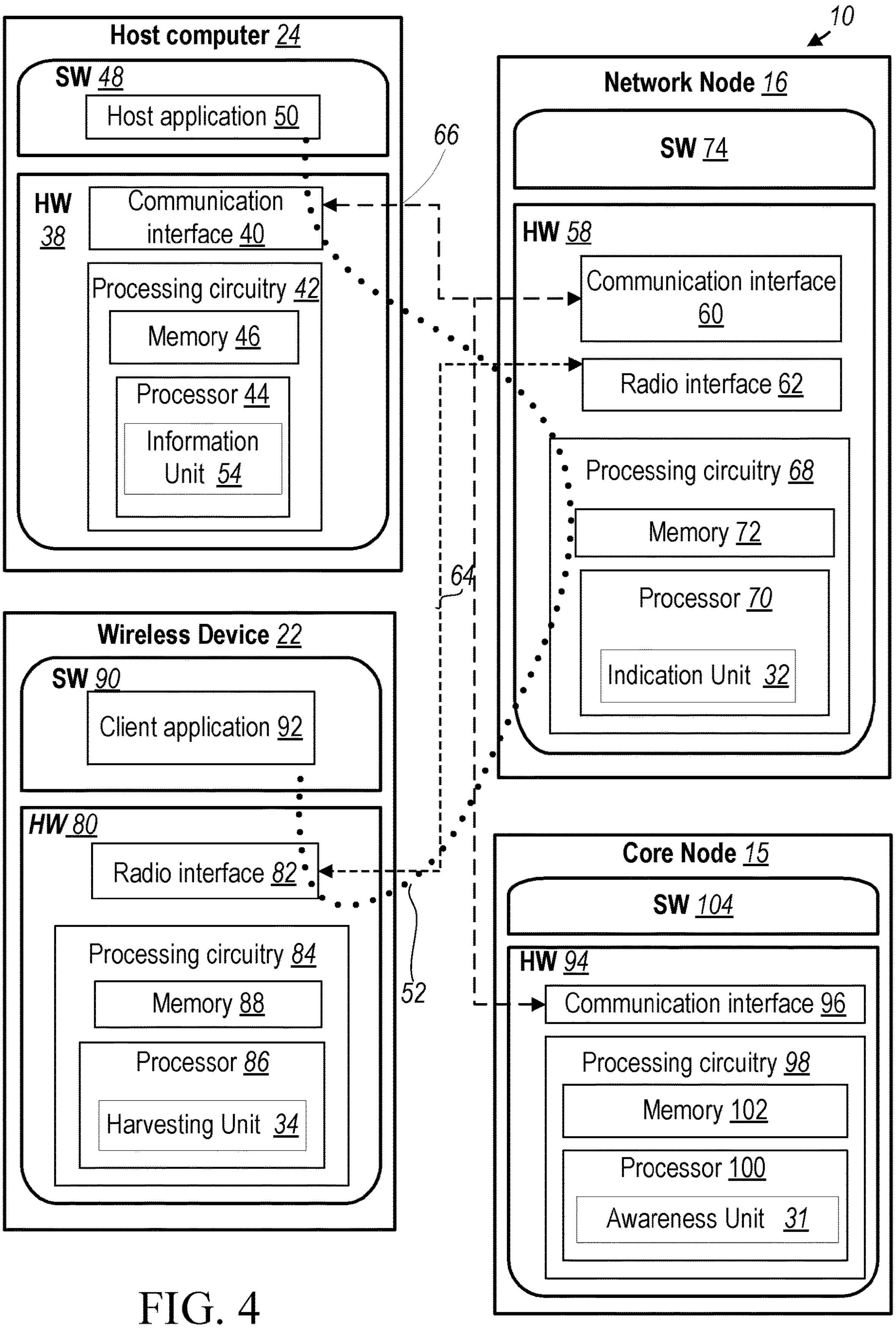
FIG. 4 is a block diagram of a host computer communicating via a network node with a wireless device over an at least partially wireless connection according to some embodiments of the present disclosure.

In some embodiments, the inner workings of the core node 15, network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as awareness unit 31, indication unit 32, and harvesting unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
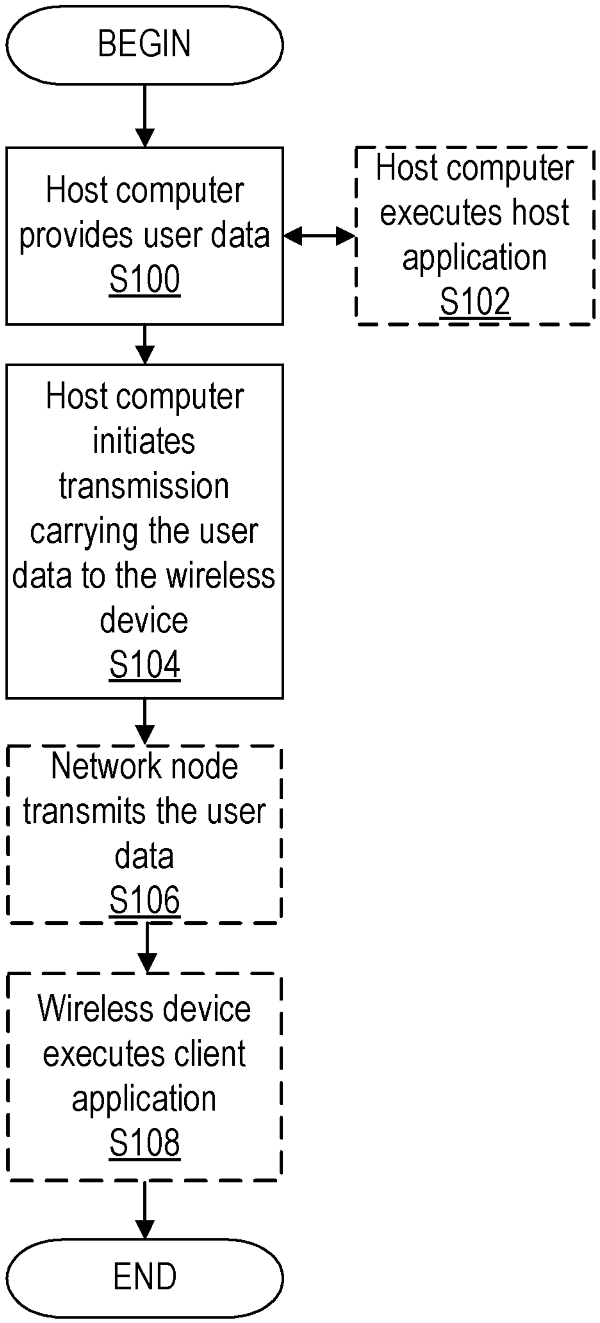
FIG. 5 is a flowchart illustrating example methods implemented in a communication system including a host computer, a network node and a wireless device for executing a client application at a wireless device according to some embodiments of the present disclosure.

FIG. 5 is a flowchart illustrating an example method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 6:
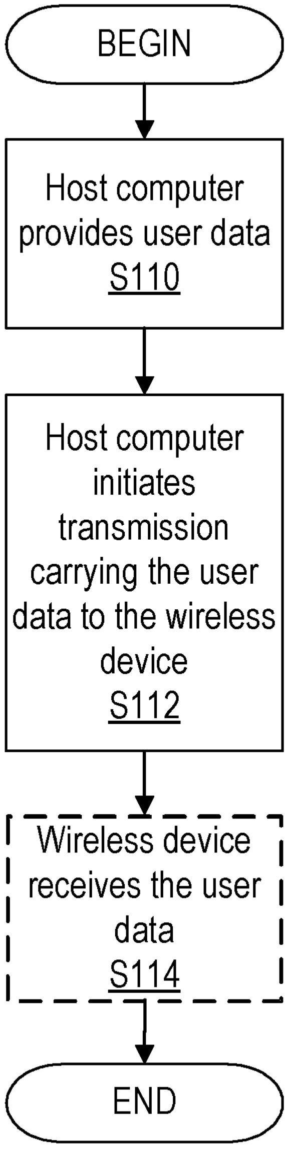
FIG. 6 is a flowchart illustrating example methods implemented in a communication system including a host computer, a network node and a wireless device for receiving user data at a wireless device according to some embodiments of the present disclosure.

FIG. 6 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 7:
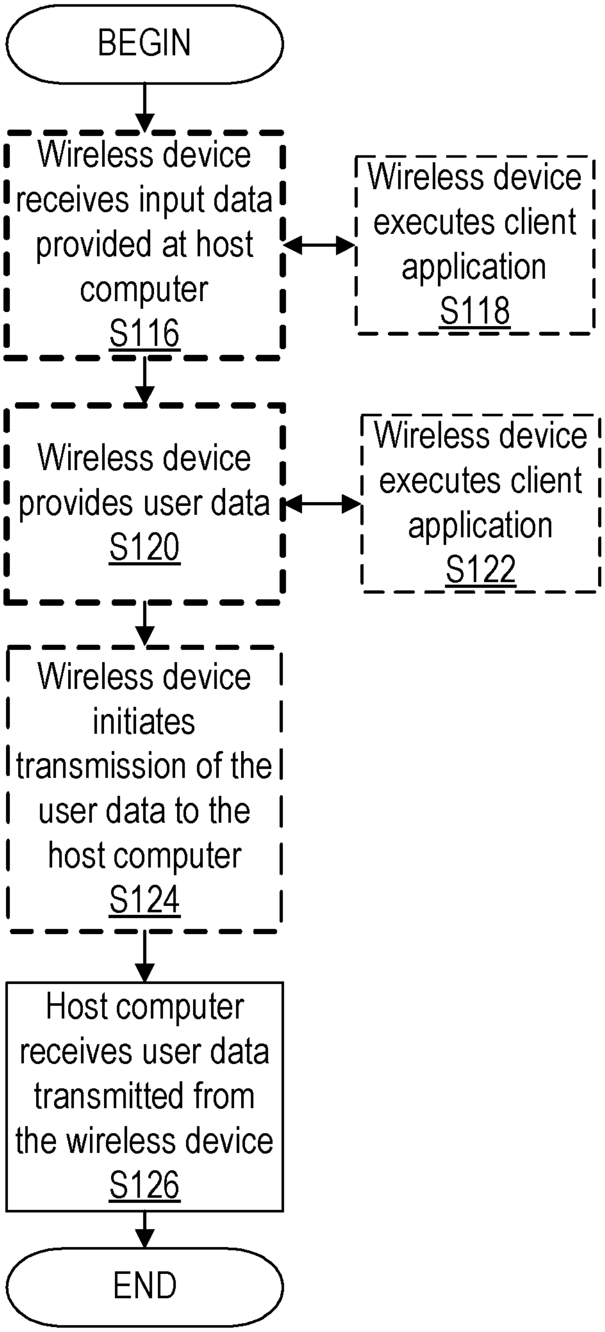
FIG. 7 is a flowchart illustrating example methods implemented in a communication system including a host computer, a network node and a wireless device for receiving user data from the wireless device at a host computer according to some embodiments of the present disclosure.

FIG. 7 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 8:
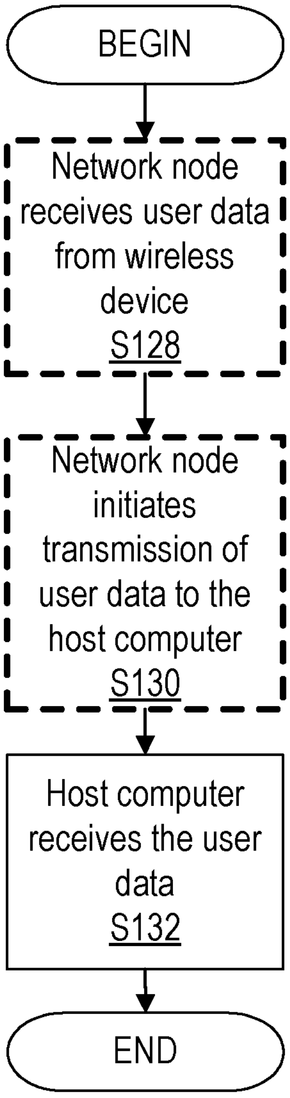
FIG. 8 is a flowchart illustrating example methods implemented in a communication system including a host computer, a network node and a wireless device for receiving user data at a host computer according to some embodiments of the present disclosure.

FIG. 8 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
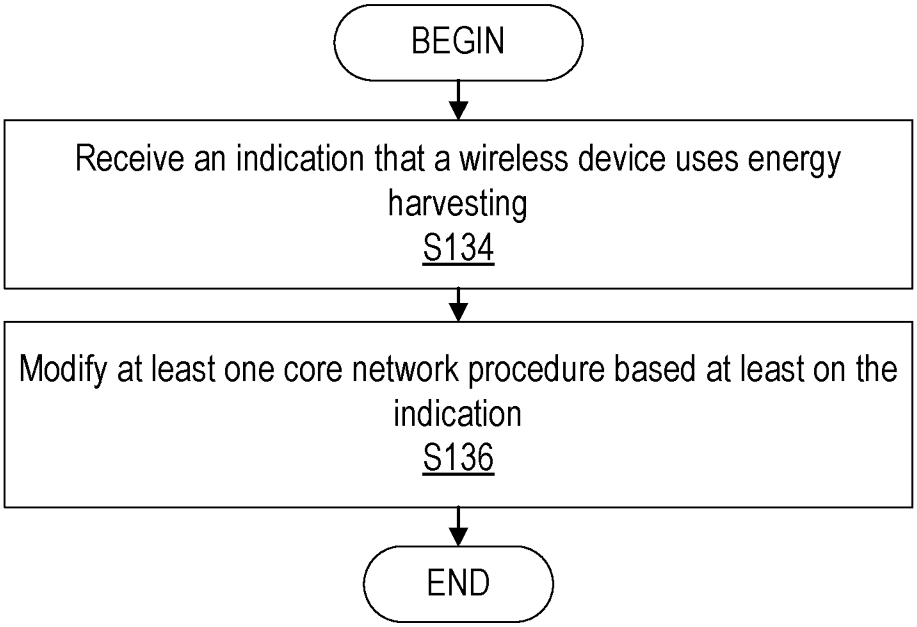
FIG. 9 is a flowchart of an example process in a core node according to some embodiments of the present disclosure.

FIG. 9 is a flowchart of an example process in a core node 15 according to some embodiments of the present disclosure. One or more blocks described herein may be performed by one or more elements of core node 15 such as by one or more of processing circuitry 98 (including the awareness unit 31), processor 100 and/or communication interface 96. Core node 15 is configured to receive (Block S134) indication that a wireless device uses energy harvesting, as described herein. Core node 15 is configured to modify (Block S136) at least one core network procedure based at least on the indication, as described herein.

According to one or more embodiments, the indication indicates at least one of: energy harvesting capability; a minimum energy level for operation; a current energy level; an energy harvesting rate; an energy harvesting time for operation; an energy harvesting service support; a time before energy level harvesting; and a minimum energy level for reporting. According to one or more embodiments, the indication is received one of: via non-access stratum, NAS, signaling, from the wireless device 22; and via signaling from the network node. According to one or more embodiments, the modified at least one core network procedure includes at least one of: buffering downlink data until activity from the wireless device 22; and modify a paging procedure used to page the wireless device 22.

Figure 10:
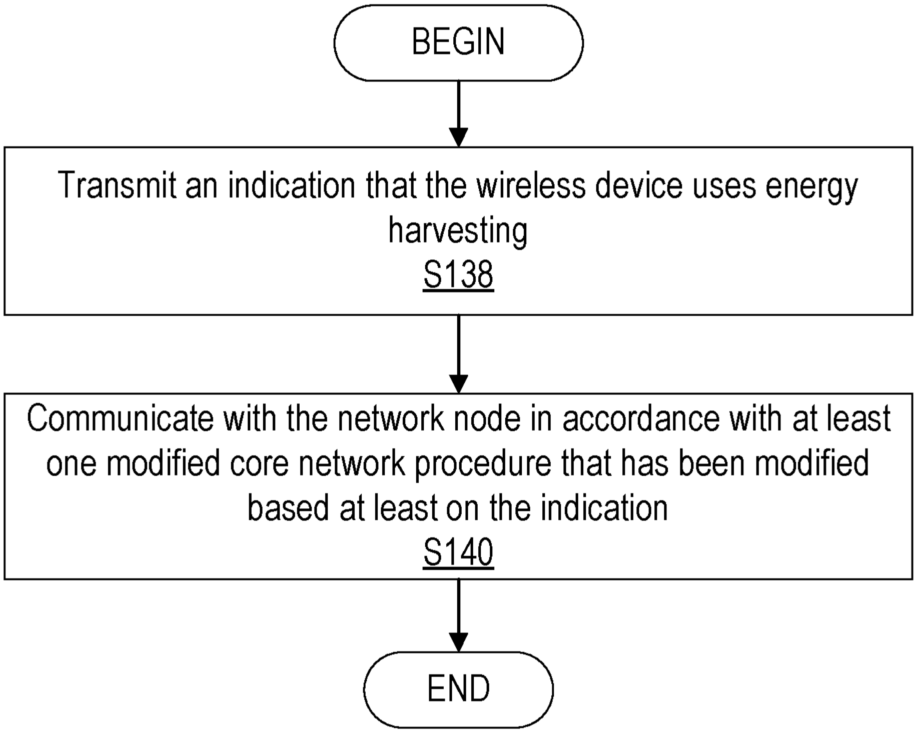
FIG. 10 is a flowchart of an example process in a wireless device according to some embodiments of the present disclosure.

FIG. 10 is a flowchart of an example process in a network node 16 according to some embodiments of the present disclosure. One or more blocks described herein may be performed by one or more elements of network node 16 such as by one or more of processing circuitry 68 (including the indication unit 32), processor 70, radio interface 62 and/or communication interface 60. Network node 16 is configured to transmit (Block S138) an indication that a wireless device uses energy harvesting, as described herein. Network node 16 is configured to communicate (Block S140) with the wireless device 22 in accordance with at least one modified core network procedure that has been modified based at least on the indication.

According to one or more embodiments, the indication indicates at least one of: energy harvesting capability; a minimum energy level for operation; a current energy level; an energy harvesting rate; an energy harvesting time for operation; an energy harvesting service support; a time before energy level harvesting; and a minimum energy level for reporting. According to one or more embodiments, the indication is transmitted via radio resource control, RRC, signaling. According to one or more embodiments, the at least one modified core network procedure corresponds to at least a modified paging procedure used to page the wireless device.

Figure 11:
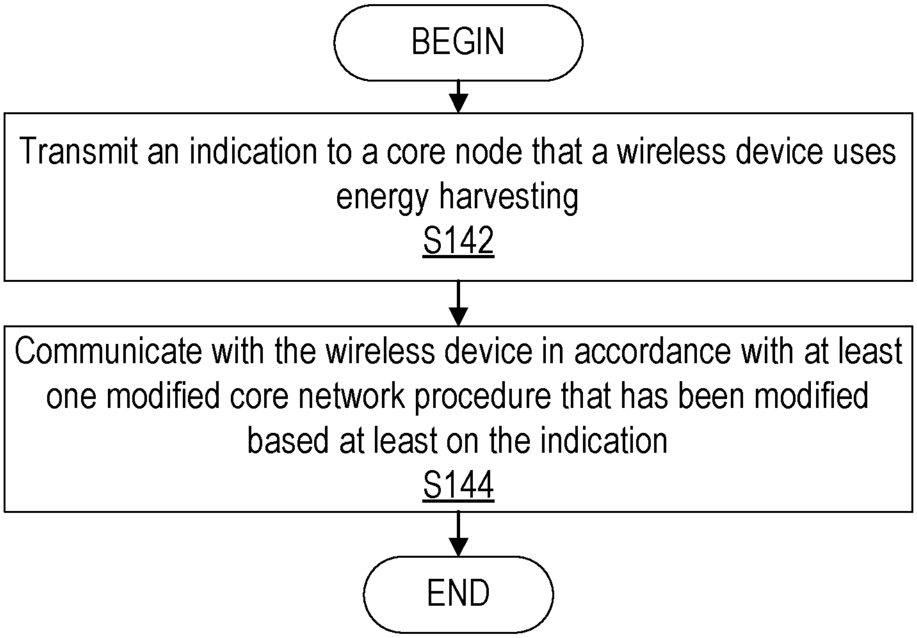
FIG. 11 is a flowchart of an example process in a network node according to some embodiments of the present disclosure.

FIG. 11 is a flowchart of an example process in a wireless device 22 according to some embodiments of the present disclosure. One or more blocks described herein may be performed by one or more elements of wireless device 22 such as by one or more of processing circuitry 84 (including the harvesting unit 34), processor 86, radio interface 82 and/or communication interface 60. Wireless device 22 is configured to transmit (Block S142) an indication that the wireless device 22 uses energy harvesting, as described herein. Wireless device 22 is configured to communicate (Block S144) with the network node 16 in accordance with at least one modified core network procedure that has been modified based at least on the indication, as described herein.

According to one or more embodiments, the indication indicates at least one of: energy harvesting capability; a minimum energy level for operation; a current energy level; an energy harvesting rate; an energy harvesting time for operation; an energy harvesting service support; a time before energy level harvesting; and a minimum energy level for reporting. According to one or mor embodiments, the indication is transmitted via non-access stratum, NAS, signaling.

According to one or more embodiments, the at least one modified core network procedure corresponds to at least a modified paging procedure used to page the wireless device 22.

Figure 12:
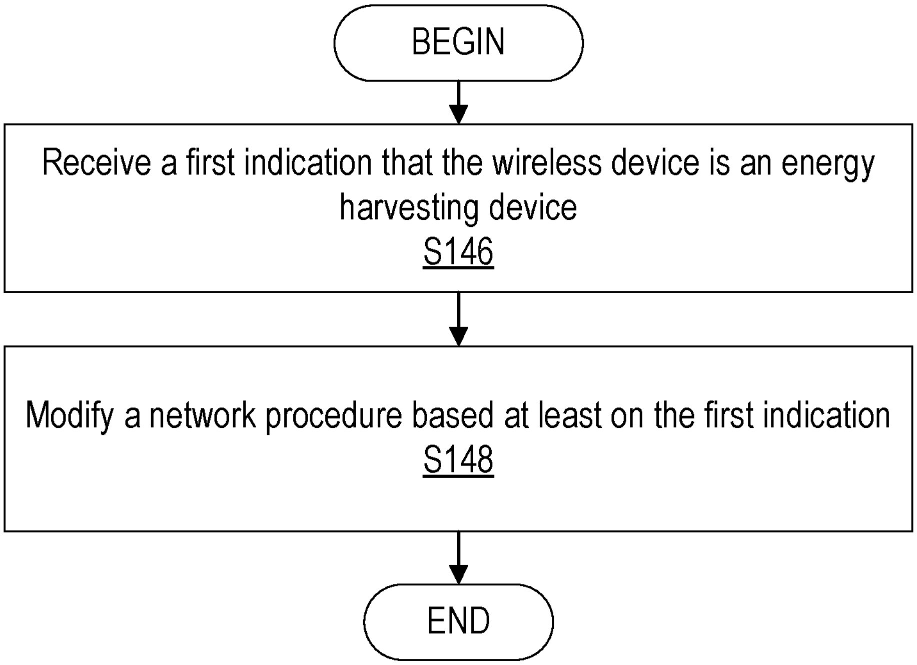
FIG. 12 is a flowchart of an example process in a core node according to some embodiments of the present disclosure.

FIG. 12 is a flowchart of another example process in a core node 15 according to some embodiments of the present disclosure. One or more blocks described herein may be performed by one or more elements of core node 15 such as by one or more of processing circuitry 98 (including the awareness unit 31), processor 100 and/or communication interface 96. Core node 15 is configured to receive (Block S146) a first indication that the wireless device 22 is an energy harvesting device, as described herein. Core node 15 is configured to modify (Block S148) a network procedure based at least on the first indication, as described herein.

According to one or more embodiments, the modifying of the network procedure includes at least one of buffering downlink data until activity is detected from the wireless device 22, and modifying a paging procedure used to page the wireless device 22. According to one or more embodiments, the network procedure is at least one of a core node 15 procedure and a network node 16 procedure. According to one or more embodiments, the first indication indicates at least one of a first energy threshold associated with the wireless device 22 entering a powered-down state, a second energy threshold associated with the wireless device 22 exiting the powered-down state, an energy harvesting schedule of the wireless device 22, and a first energy harvesting rate of the wireless device 22. The first energy harvesting rate is at least one of an average energy harvesting rate, a predicted energy harvesting rate, and a historical energy harvesting rate. According to one or more embodiments, the processing circuitry 98 is further configured to modify the network procedure by implicitly determining that the wireless device 22 has entered into the powered-down state, pausing a paging procedure based on the implicit determination, implicitly determining that the wireless device 22 has exited from the powered-down state, and resuming the paging procedure based on the implicit determination.

According to one or more embodiments, the processing circuitry 98 is further configured to receive a second indication from the wireless device 22 indicating at least one of a current energy level of the wireless device 22, a current energy harvesting rate, a first expected time to reach the first energy threshold, and a second expected time to reach the second energy threshold, and the implicit determination that the wireless device 22 has entered into the powered-down state is based on the first indication the second indication. According to one or more embodiments, the processing circuitry 98 is further configured to receive a third indication from the network node 16 indicating that the wireless device 22 has failed to respond to a page, and the implicit determination that the wireless device 22 has entered into the powered-down state is further based on the third indication.

According to one or more embodiments, implicitly determining that the wireless device 22 has entered into the powered-down state includes estimating a first time when a current energy level of the wireless device 22 will fall below the first energy threshold, where the estimating is based on at least one of a length of time associated with the wireless device 22 failing to respond to a page, the current energy level of the wireless device 22, the first energy harvesting rate of the wireless device 22, a current energy harvesting rate of the wireless device 22, and the energy harvesting schedule of the wireless device 22.

According to one or more embodiments, implicitly determining that the wireless device 22 has exited from the powered-down state includes estimating a second time when a current energy level of the wireless device 22 will rise above the second energy threshold, where the estimating is based on at least one of the current energy level of the wireless device 22, the first energy harvesting rate of the wireless device 22, a current energy harvesting rate of the wireless device 22, and the energy harvesting schedule of the wireless device 22. According to one or more embodiments, the paging procedure is a legacy paging procedure. According to one or more embodiments, the first indication is received at least one of via non-access stratum, NAS, signaling, from the wireless device 22, and via signaling from the network node 16.

Figure 13:
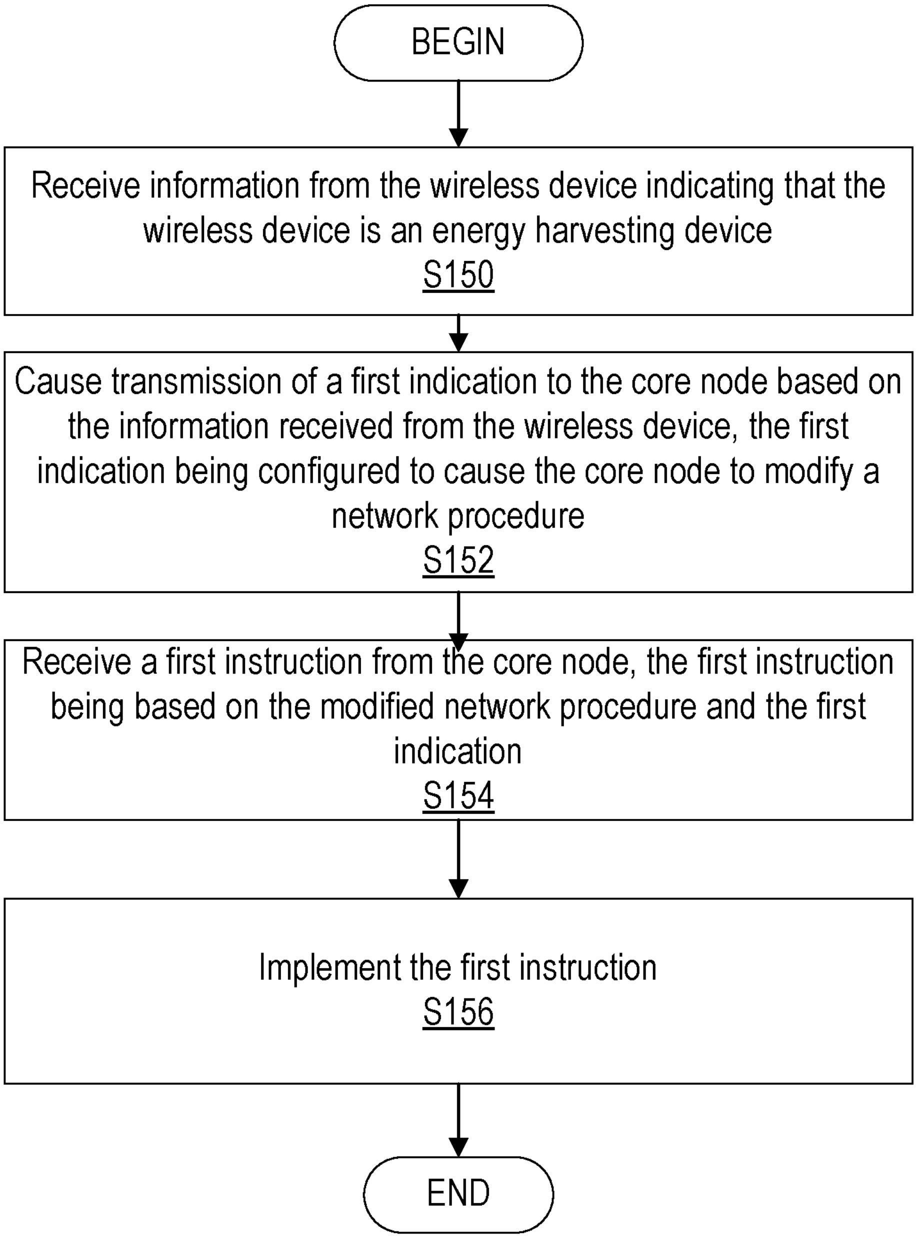
FIG. 13 is a flowchart of an example process in a network node according to some embodiments of the present disclosure.

FIG. 13 is a flowchart of an example process in a network node 16 according to some embodiments of the present disclosure. One or more blocks described herein may be performed by one or more elements of network node 16 such as by one or more of processing circuitry 68 (including the indication unit 32), processor 70, radio interface 62 and/or communication interface 60. Network node 16 is configured to receive (Block S150) information from the wireless device indicating that the wireless device is an energy harvesting device, as described herein. Network node 16 is configured to cause transmission (Block S152) of a first indication to the core node, where the first indication is based on the received information and configured to cause the core node to modify a network procedure, as described herein. Network node 16 is configured to receive (Block S154) a first instruction from the core node, where the first instruction is based on the modified network procedure and the first indication, as described herein. Network node 16 is configured to implement (Block S156) the instruction, as described herein.

According to one or more embodiments, the modifying of the network procedure includes at least one of buffering downlink data until activity is detected from the wireless device 22, and modifying a paging procedure used to page the wireless device 22. According to one or more embodiments, the network procedure is at least one of a core node 14 procedure and a network node 16 procedure. According to one or more embodiments, the first indication indicates at least one of a first energy threshold associated with the wireless device 22 entering a powered-down state, a second energy threshold associated with the wireless device 22 exiting the powered-down state, an energy harvesting schedule of the wireless device 22, and a first energy harvesting rate of the wireless device 22, where the first energy harvesting rate is at least one of an average energy harvesting rate, a predicted energy harvesting rate, and a historical energy harvesting rate.

According to one or more embodiments, the processing circuitry 68 is further configured to receive additional information from the wireless device 22 indicating at least one of a current energy level of the wireless device 22, a current energy harvesting rate, a first expected time to reach the first energy threshold, and a second expected time to reach the second energy threshold, and cause a transmission of a second indication to the core node 14, where the second indication is based on the received additional information, and the first instruction is further based on the second indication. According to one or more embodiments, the first instruction is configured to cause the network node 16 to pause a paging procedure associated with the wireless device 22 at a first time.

According to one or more embodiments, the processing circuitry 68 is further configured to receive a second instruction from the core node 14, the second instruction is based on the modified network procedure and at least one of the first indication and the second indication, and implement the second instruction, the second instruction is configured to cause the network node 16 to resume the paging procedure at a second time based on at least one of the first indication and the second indication indicating a time to reach the second energy threshold is less than a difference between the second time and the first time. According to one or more embodiments, the paging procedure is a legacy paging procedure.

Figure 14:
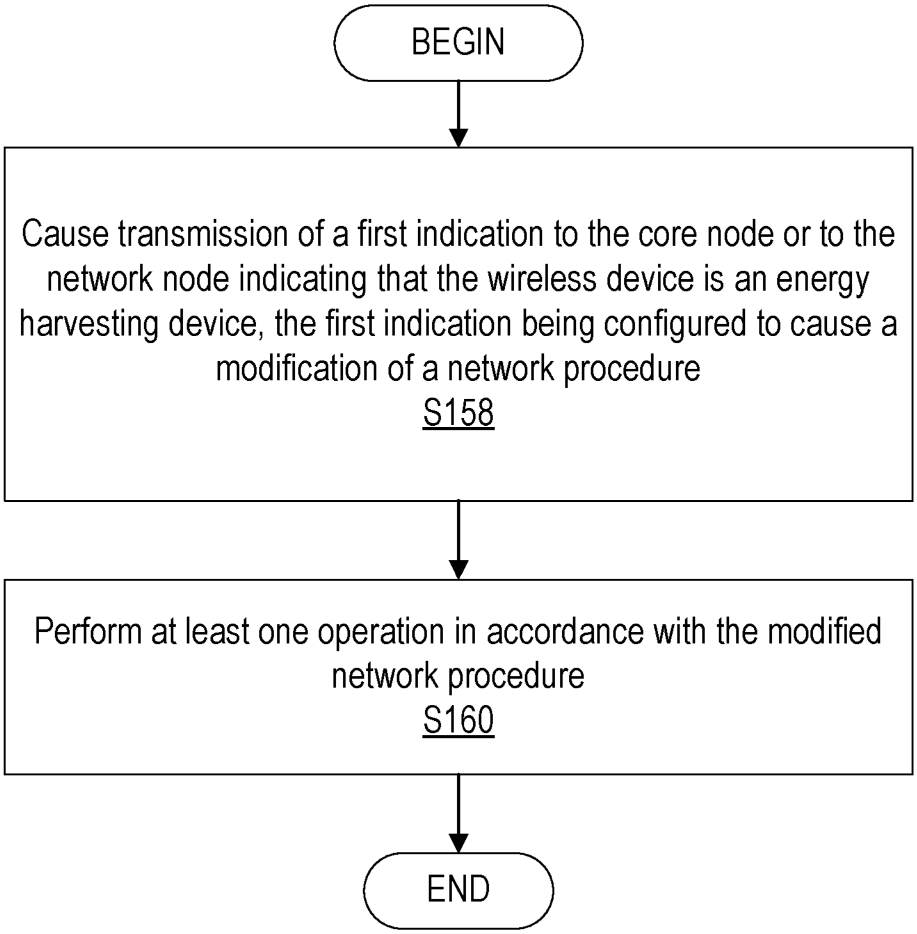
FIG. 14 is a flowchart of an example process in a wireless device according to some embodiments of the present disclosure.

FIG. 14 is a flowchart of an example process in a wireless device 22 according to some embodiments of the present disclosure. One or more blocks described herein may be performed by one or more elements of wireless device 22 such as by one or more of processing circuitry 84 (including the harvesting unit 34), processor 86, radio interface 82 and/or communication interface 60. Wireless device 22 is configured to cause transmission (Block S158) of a first indication to the core node or to the network node indicating that the wireless device is an energy harvesting device, where the first indication is configured to cause a modification of a network procedure, as described herein. Wireless device 22 is configured to perform (Block S160) at least one operation in accordance with the modified network procedure, as described herein.

According to one or more embodiments, the modification of the network procedure includes at least one of buffering downlink data until activity is detected from the wireless device 22, and modifying a paging procedure used to page the wireless device 22. According to one or more embodiments, the network procedure is at least one of a core node 14 procedure and a network node 16 procedure. According to one or more embodiments, the first indication indicates at least one of a first energy threshold associated with entering a powered-down state, a second energy threshold associated with exiting the powered-down state, an energy harvesting schedule of the wireless device 22, and a first energy harvesting rate of the wireless device 22, where the first energy harvesting rate is at least one of an average energy harvesting rate, a predicted energy harvesting rate, and a historical energy harvesting rate. According to one or more embodiments, the processing circuitry 84 is further configured to cause a transmission of a second indication to the core node 14 or to the network node 16, where the indication indicates at least one of a current energy level of the wireless device 22, a current energy harvesting rate, a first expected time to reach the first energy threshold, and a second expected time to reach the second energy threshold.

According to one or more embodiments, the at least one operation includes receiving a first page from the network node 16 according to a paging procedure, entering a powered-down state based on a current energy level of the wireless device 22 falling below a first energy threshold, exiting the powered-down state based on the current energy level rising above a second energy threshold, and receiving a second page from the network node 16 according to the paging procedure, where the second page is received based on the modified network procedure, the first indication, and the second indication. According to one or more embodiments, the paging procedure is a legacy paging procedure.

According to one or more embodiments, the first indication is transmitted via non-access stratum, NAS, signaling.

Having generally described arrangements for procedure and/or signaling modification associated with wireless devices operating on harvested energy, details for these arrangements, functions and processes are provided as follows, and which may be implemented by the network node 16, wireless device 22 and/or host computer 24.

Some embodiments provide procedure and/or signaling modification associated with wireless devices operating on harvested energy. One or more core node 15 functions described below may be performed by one or more of processing circuitry 98, processor 100, communication interface 96, awareness unit 31, etc. One or more network node 16 functions described below may be performed by one or more of processing circuitry 68, processor 70, communication interface 60, indication unit 32, etc. One or more wireless device 22 functions described below may be performed by one or more of processing circuitry 84, processor 86, radio interface 82, harvesting unit 34, etc.

Figure 15:
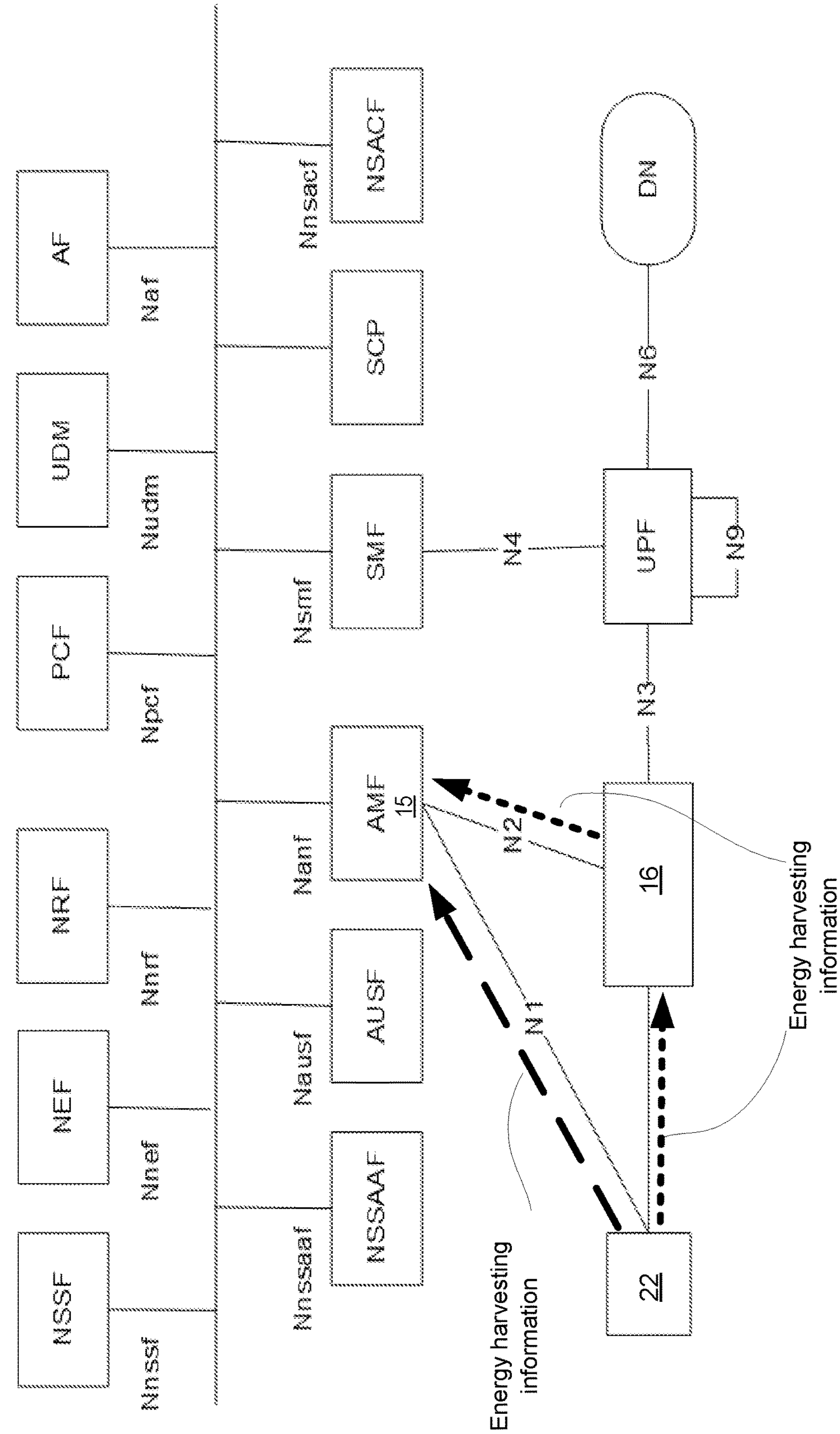
FIG. 15 is a diagram of communication interfaces in the system according to some embodiments of the present disclosure.

FIG. 15 is a block diagram of examples of communication interfaces between various entities in system 10 according to some embodiments of the present disclosure, in which wireless device 22 may signal energy harvesting information to core node 15 (e.g., AMF core node 15), and/or wireless device 22 may signal energy harvesting information to network node 16, and network node 16 may transmit the energy harvesting information received from wireless 22 to the core node 15 (e.g., AMF core node 15), as described herein.

CN (e.g., Core Node 15) Awareness of Energy Harvesting

In a first embodiment of the present disclosure, CN is made aware that wireless device 22 is operating using energy harvesting. As used herein, CN may refer to core node 15 (e.g., AMF core node 15).

In one alternative of this embodiment, the energy harvesting capability/information is signaled over non-access stratum (NAS) and stored in wireless device context. The information can be changed dynamically during NAS Registration/Attach to the network (e.g., network node 16). It also includes additional information about wireless device 22's current energy level, expected time for accumulating a certain amount of energy, an indication of how much energy wireless device 22's can harvest per time unit (e.g., quantified in a certain range), harvesting time (e.g., quantified in a certain range) that wireless device 22 would need to ensure it has a certain (i.e., predefined) amount of energy for communication, the level of remaining energy, that wireless device 22 is in critical or normal level of power, type of energy harvesting (i.e., RF, vibrational, solar, etc.), information of the time wireless device 22 may be unavailable, if wireless device 22 is currently reachable (e.g., embodiment on PSM/MICO below), etc.

TABLE 1

| Example information | | |
|---|---|---|
| Energy harvesting information | Unit | Description |
| Energy harvesting capability indication | Yes/No | |
| Minimum level of energy level for operation/communication | a % | |
| Current energy level | b % | |
| Energy harvesting rate | c % per time unit | |
| | (min) | |
| Energy harvesting time for operation/communication | X min | |
| xxx (. . .) | | |

In another alternative, the CN is made aware of wireless device 22 operating using energy harvesting by indication from a RAN node (e.g., network node 16). The RAN node may be made aware of this information based on communication with wireless device 22, and that information may then be provided by the RAN to the CN, e.g., by network node 16 to core node 15.

In an example, an indication that wireless device 22 is using energy harvesting (i.e., energy harvesting information) is included in RRC signaling from wireless device 22 to network node 16, for example during RRC connection setup procedure in RRCSetupRequest, RRCResumeRequest and/or RRCSetupComplete. Network node 16, after processing such an indication, provides the information to core node 15, such as AMF.

In an additional embodiment, the energy harvesting used by wireless device 22 is added to subscription information control as shown in Table 2 below.

TABLE 2

| Energy harvesting subscription | Unit | Description |
|---|---|---|
| Energy harvesting service support | Yes/No | |
| Default Minimum level of energy level for operation/communication | S % | |
| xxx (. . .) | | |

In an additional embodiment, the possibility for wireless device 22 to operate using energy harvesting with the support from network node 16 is indicated by network node 16 to wireless device 22 during Registration/Attach based on wireless device 22's energy harvesting information, subscription information and/or serving network policy. Network node 16 can also instruct wireless device 22 to report energy harvesting information. An example of information associated with this embodiment is shown below in Table 3.

TABLE 3

| Energy harvesting subscription | Unit | Description |
|---|---|---|
| Energy harvesting service support indication | Yes/No | |
| Minimum level of energy level for reporting | Y % | |
| Time before critical energy level harvesting | seconds, mins | |
| xxx (. . .) | | |

In an additional embodiment, wireless device 22 is using the "sleep" state of the MICO/PSM function to harvest energy, thus the parameters for MICO/PSM are adapted based on the energy harvest needs of wireless device 22, i.e., MICO/PSM parameters provided by wireless device 22 are adapted by wireless device 22 and the parameters provided by network node 16 to wireless device 22 may also consider the adaptation for energy harvesting based on wireless device subscription information.

In an additional embodiment, wireless device 22 operating using energy harvesting is interpreted/treated as if wireless device 22 is under power constraints and hence is released from Connected mode (RRC_CONNECTED or CM-CONNECTED) as quickly as possible to enable wireless device 22 to return to a power saving state. The power saving state can be for example RRC_IDLE or CM-IDLE mode, or RRC_INACTIVE mode when the CN is aware that wireless device 22 in RRC_INACTIVIE is using energy harvesting and may not be reachable for downlink paging without a delay.

Modified CN Procedures and Wireless Device 22 State Handling

Sleep State and Powered-Down State

When MICO/PSM "sleep state" is used for energy harvesting, the setting of the mobility periodic update timer T3412/T3512, and the Active timer T3324 are based at least on wireless device 22 requested value, subscription information and/or also network policy with the consideration of energy harvesting needs.

In one embodiment, a new powered-down state is introduced for wireless devices 22 operating using energy harvesting. This new state is similar to the sleep state in MICO (or PSM for LTE), where wireless device 22 is effectively still registered to the network/network node 16 but is in a power-down state to save power (and harvest energy) and therefore is not reachable in the downlink by network node 16. Similar to MICO/PSM, CN buffers any DL data and waits for activity from wireless device 22.

One difference of one or more embodiments to MICO/PSM would be the triggering for entering and leaving this powered-down state. In general, it could be unpredictable for network node 16 to known when wireless device 22 becomes energy depleted and enters this state (e.g., power-down state, energy saving state). Therefore, implicitly entering of the powered-down state is supported in the network. To wireless device 22 itself, this would be clear, but network node 16 would need to rely on some indirect indication, e.g., a certain time (or certain counter) of irresponsiveness from wireless device 22 (not responding to physical downlink control channel (PDCCH) during a connection, or not responding to paging in the last known cell, registration area, or tracking area). To support the entering of this state at network node 16 side, some additional information (as specified in one or more of the examples and/or tables above) related to energy harvesting could be used as and/or as part of assistance information, e.g., that wireless device 22 reports to network node 16 (e.g., over NAS) when the energy level in wireless device 22 energy storage falls below a certain level, which can be semi-persistently configurable by the network node 16. That is, wireless device 22 reports when it is about to become energy depleted and is soon expected to enter or initiate the powered-down state. Network node 16 can, based at least on such information, deduce/determine the possible time for wireless device 22 entering powered-down state in conjunction with the paging activity as described in the "Modified paging procedure" section below.

Exiting the powered-down state may be triggered by wireless device 22 activity such as by either explicit signaling to network node 16 when energy levels have been restored (e.g., above a pre-configured level), or triggering by any activity from wireless device 22, e.g., mobile originated transmission in the uplink, either transmission of user-plane data or control signaling (RAU/TAU, etc.). Alternatively, the exiting of the powered-down state could also be "implicit", e.g., based on a reported harvesting time (e.g., as described above such as in one of the table examples) after which it can be assumed wireless device 22 has restored its energy to above a certain level. Unlike MICO/PSM, the powered-down state would only be entered occasionally when needed, and when not needed, wireless device 22 can be configured with a separate legacy configuration for power saving and downlink reachability, e.g., configured with eDRX (to achieve a shorted DL latency).

Note, in one or more embodiments, "implicit" means that semi-persistent information as described in the "CN awareness of energy harvesting" section can be used but no explicit and dynamic signaling is transmitted upon the state transition.

Figure 16:
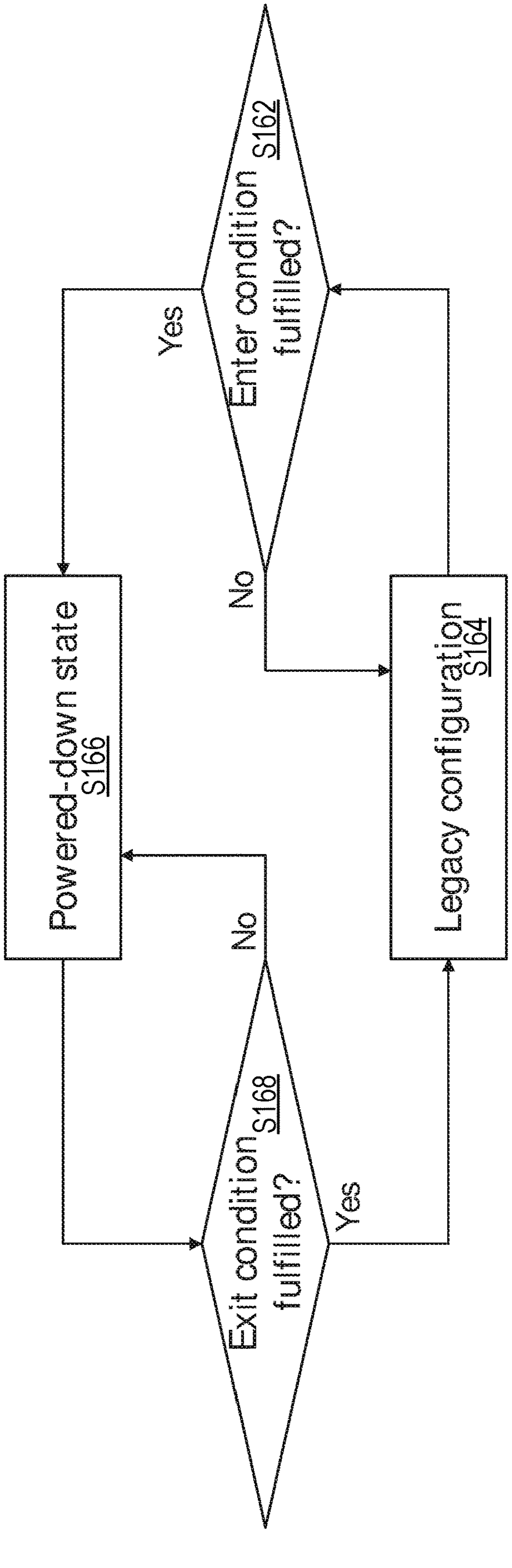
FIG. 16 is a flow diagram of an example process in, for example, a wireless device according to some embodiments of the present disclosure.

FIG. 16 is a flow diagram of an example of wireless device 22 processing according to one or more embodiments of the present disclosure. For example, wireless device 22 may determine (Block S162) whether an enter condition is fulfilled, e.g., whether a condition to enter a power-down state has been fulfilled. If the condition to enter a power-down state has not been fulfilled, wireless device 22 is configured to implement (Block S164) a legacy configuration. If the enter condition is fulfilled, wireless device 22 is configured to enter or trigger (Block S166) a powered-down state, as described herein.

Wireless device 22 may also determine (Block S168) whether an exit condition is fulfilled, e.g., determine whether to exit the powered-down state. If wireless device 22 determines an exit condition has not been fulfilled, wireless device 22 remains in the power-down state. If wireless device 22 determines an exit condition has been fulfilled, wireless device 22 exits the powered-down state and performs Block S164.

Registration Procedure Updates

The Registration/Attach/TAU procedure in 3GPP TS 23.502/23.401 may be updated to support the delivery of information among different entities as described in the "CN awareness of energy harvesting" section.

Modified Paging Procedure

In an existing paging procedure, when the CN, such as via network node 16, pages wireless device 22, the CN, such as via network node 16, may send a series of paging messages attempting to reach wireless device 22. On top of sending several paging messages, the CN, such as via network node 16, can also page wireless device 22 in different numbers of cells. One paging strategy is that wireless device 22 is first paged in the last known cell, i.e., the last cell that wireless device 22 was in when in communication with network node 16. If wireless device 22 does not respond to paging in the last known cell, the CN, such as via network node 16, may attempt to page wireless device 22 in other cells assuming that wireless device 22 probably has moved to a different cell.

Wireless device 22 which is operating on harvested energy may not be able to receive any signals from network node 16 when wireless device 22 enters the powered-down state. This means that wireless device 22 may not be able to read potential paging from network node 16.

In one embodiment, the CN, such as via network node 16, determines that wireless device 22 is in a powered-down state, based on the information described the "CN awareness of energy harvesting" section in conjunction with the lack of paging response, and may apply a specific paging behavior for such a wireless device 22, and apply the existing normal paging behavior wireless device 22 which does not operate in powered-down state.

The first behavior may, for example, be that the CN, such as via network node 16, assumes that, if wireless device 22 does not respond to paging, wireless device 22 is out of power and may return later meaning that network node 16 does not attempt to page wireless device 22 again (or only page a limited/predefined number of times before giving up) or that the CN, such as via network node 16, does not attempt to page wireless device 22's other cells (or only in a limited/predefined number of other cells).

The CN, such as via network node 16, may be having information about the time T during which wireless device 22 is unreachable since wireless device 22 has not yet harvested sufficient energy to be able to communicate with network node 16. In one embodiment, the CN, such as via network node 16, uses such information in its paging strategy. For example, if the CN paged wireless device 22 but wireless device 22 did not respond, the CN, such as via network node 16, may wait until after the time T before the CN, such as via network node 16, attempts to page wireless device 22 again in order to have a better chance or to know that wireless device 22 would be reachable. The T time can be deduced by network node 16 based at least on wireless device 22 provided information as described in the examples in the "CN awareness of energy harvesting" section.

RRC_INACTIVE

In one embodiment, the energy harvesting wireless device 22 is in RRC_INACTIVE (and CM-CONNECTED) state but as it has indicated it is operating in energy harvesting mode, network node 16 is aware wireless device 22 is not always reachable. This wireless device 22 can in this state use extended DRX (eDRX) cycles to enable power saving, if such are supported by the specification and wireless device 22 and network node 16. If network node 16 already has information that wireless device 22 is not always reachable in RRC_INACTIVE due to it having been configured with eDRX, or that it is reachable for paging according to its eDRX configuration, the indication that wireless device 22 is using energy harvesting provides additional information for network node 16 that the traffic patterns and the capability of wireless device 22 to transmit or receive depends on its ability to harvest enough energy.

This embodiment can be combined with the above embodiments, e.g., to provide detailed information of wireless device 22's energy harvesting parameters or capability.

Therefore, one or more embodiments described herein provide for CN, e.g., via network node 16, awareness that the wireless device is operating on harvested energy, and provide for adaptations for, e.g., downlink reachability, to work properly.

SOME EXAMPLES

Example A1. A core node 15 configured to, and/or comprising a radio interface and/or comprising processing circuitry configured to:

receive an indication that a wireless device 22 uses energy harvesting; and modify at least one core network procedure based at least on the indication.

Example A2. The core node 15 of Example A1, wherein the indication indicates at least one of:

energy harvesting capability;

a minimum energy level for operation;

a current energy level;

an energy harvesting rate;

an energy harvesting time for operation;

an energy harvesting service support;

a time before energy level harvesting; and a minimum energy level for reporting.

Example A3. The core node 15 of Example A1, wherein the indication is received one of:

via non-access stratum, NAS, signaling, from the wireless device 22; and via signaling from the network node 16.

Example A4. The core node 15 of any one of Examples A1-A3, wherein the modified at least one core network procedure includes at least one of:

buffering downlink data until activity from the wireless device 22; and modify a paging procedure used to page the wireless device 22.

Example B1. A method implemented in a core node 15, the method comprising: receiving an indication that a wireless device 22 uses energy harvesting; and modifying at least one core network procedure based at least on the indication.

Example B2. The method of Example B1, wherein the indication indicates at least one of:

energy harvesting capability;

a minimum energy level for operation;

a current energy level;

an energy harvesting rate;

an energy harvesting time for operation;

an energy harvesting service support;

a time before energy level harvesting; and a minimum energy level for reporting.

Example B3. The method of any one of Examples B1-B2, wherein the indication is received one of:

via non-access stratum, NAS, signaling, from the wireless device 22; and via signaling from the network node 16.

Example B4. The method of any one of Examples B1-B3, wherein the modified at least one core network procedure includes at least one of:

buffering downlink data until activity from the wireless device 22; and modify a paging procedure used to page the wireless device 22.

Example C1. A wireless device 22 configured to communicate with a network node 16, the wireless device 22 configured to, and/or comprising a radio interface and/or processing circuitry configured to:

transmit an indication that the wireless device 22 uses energy harvesting; and communicate with the network node 16 in accordance with at least one modified core network procedure that has been modified based at least on the indication.

Example C2. The wireless device 22 of Example C1, wherein the indication indicates at least one of:

energy harvesting capability;

a minimum energy level for operation;

a current energy level;

an energy harvesting rate;

an energy harvesting time for operation;

an energy harvesting service support;

a time before energy level harvesting; and a minimum energy level for reporting.

Example C3. The WD of any one of Examples C1-C2, wherein the indication is transmitted via non-access stratum, NAS, signaling.

Example C4. The wireless device 22 of any one of Examples C1-C3, wherein the at least one modified core network procedure corresponds to at least a modified paging procedure used to page the wireless device 22.

Example D1. A method implemented in a wireless device 22, the method comprising:

transmitting an indication that the wireless device 22 uses energy harvesting; and communicating with the network node 16 in accordance with at least one modified core network procedure that has been modified based at least on the indication.

Example D2. The method of Example D1, wherein the indication indicates at least one of:

energy harvesting capability;

a minimum energy level for operation;

a current energy level;

an energy harvesting rate;

an energy harvesting time for operation;

an energy harvesting service support;

a time before energy level harvesting; and a minimum energy level for reporting.

Example D3. The method of Example D1, wherein the indication is transmitted via non-access stratum, NAS, signaling.

Example D4. The method of any one of Examples D1-D3, wherein the at least one modified core network procedure corresponds to at least a modified paging procedure used to page the wireless device 22.

Example E1. A network node 16 configured to, and/or comprising a radio interface and/or comprising processing circuitry configured to:

transmit an indication that a wireless device 22 uses energy harvesting; and communicate with the wireless device 22 in accordance with at least one modified core network procedure that has been modified based at least on the indication.

Example E2. The network node 16 of Example E1, wherein the indication indicates at least one of:

energy harvesting capability;

a minimum energy level for operation;

a current energy level;

an energy harvesting rate;

an energy harvesting time for operation;

an energy harvesting service support;

a time before energy level harvesting; and a minimum energy level for reporting.

Example E3. The network node 16 of any one of Examples E1-E2, wherein the indication is transmitted via radio resource control, RRC, signaling.

Example E4. The network node 16 of any one of Examples E1-E3, wherein the at least one modified core network procedure corresponds to at least a modified paging procedure used to page the wireless device 22.

Example F1. A method implemented by a network node 16, the method comprising:

transmitting an indication that a wireless device 22 uses energy harvesting; and communicating with the wireless device 22 in accordance with at least one modified core network procedure that has been modified based at least on the indication.

Example F2. The method of Example F1, wherein the indication indicates at least one of:

energy harvesting capability;

a minimum energy level for operation;

a current energy level;

an energy harvesting rate;

an energy harvesting time for operation;

an energy harvesting service support;

a time before energy level harvesting; and a minimum energy level for reporting.

Example F3. The method of any one of Examples F1-F2, wherein the indication is transmitted via radio resource control, RRC, signaling.

Example F4. The method of any one of Examples F1-F3, wherein the at least one modified core network procedure corresponds to at least a modified paging procedure used to page the wireless device 22.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

3GPP 3rd Generation Partnership Project
BWP Bandwidth Part
C-RNTI Cell Radio Network Temporary Identifier
CG Configured Grant
CORESET Control Resource Set
CSS Common Search Space
DCI Downlink Control Information
eMBB enhanced Mobile Broadband
eRedCap Enhanced Reduced Capability NR Devices
IE Information Element
LPWA Low power wide area
LTE Long-Term Evolution
MAC-CE Medium Access Control-Control Element
MICO Mobile Originated Communication Only
MIMO Multiple-Input and Multiple-Output
mMTC massive Machine-Type Communication
Msg1 Message 1 during random access
Msg2 Message 2 during random access
MTC Machine-Type Communications
NB-IoT Narrowband Internet of Things
NR New Radio
NW Network
RAI Release Assistance Information
RedCap Reduced Capability NR Devices
RRC Radio Resource Control
PDCCH Physical Downlink Control Channel
PUCCH Physical Uplink Control Channel
PUSCH Physical Uplink Shared Channel
RACH Random Access Channel
PRB Physical Resource Block
PSM Power Saving Mode
RAR Random Access Response
SDT Small Data Transmission
SCS Subcarrier Spacing
SI System information
SIB System information block
SRS Sounding Reference Signal
SSB Synchronization Signal Block
UAI UE Assistance Information
UCI Uplink Control information
UE User equipment
URLLC Ultra-Reliable Low-Latency Communication It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A core node for communication with a wireless device and a network node, the core node comprising processing circuitry configured to:
- receive a first indication that the wireless device is an energy harvesting device, the first indication indicating:
  - a first energy threshold associated with the wireless device entering a powered-down state; or
  - a second energy threshold associated with the wireless device exiting the powered-down state; or
  - an energy harvesting schedule of the wireless device; or
  - a first energy harvesting rate of the wireless device, the first energy harvesting rate being:
    - an average energy harvesting rate; or
    - a predicted energy harvesting rate; or
    - a historical energy harvesting rate; and
- modify a network procedure based at least on the first indication, the modifying the network procedure comprising:
  - implicitly determining that the wireless device has entered into the powered-down state;
  - pausing a paging procedure based on the implicit determination that the wireless device has entered into the powered-down state;
  - implicitly determining that the wireless device has exited from the powered-down state; and
  - resuming the paging procedure based on the implicit determination that the wireless device has exited from the powered-down state.

2. The core node of claim 1, wherein the modifying of the network procedure includes:
- buffering downlink data until activity is detected from the wireless device; or
- modifying a paging procedure used to page the wireless device.

3. The core node of claim 1, wherein the network procedure is a core node procedure or a network node procedure.

4. The core node of claim 1, wherein the processing circuitry is further configured to:
- receive a second indication from the wireless device indicating:
  - a current energy level of the wireless device; or
  - a current energy harvesting rate; or
  - a first expected time to reach the first energy threshold; or
  - a second expected time to reach the second energy threshold; and the implicit determination that the wireless device has entered into the powered-down state being based on the first indication the second indication.

5. The core node of claim 1, wherein the processing circuitry is further configured to receive a third indication from the network node indicating that the wireless device has failed to respond to a page; and the implicit determination that the wireless device has entered into the powered-down state being further based on the third indication.

6. The core node of claim 1, wherein implicitly determining that the wireless device has entered into the powered-down state includes estimating a first time when a current energy level of the wireless device will fall below the first energy threshold, the estimating being based on:

a length of time associated with the wireless device failing to respond to a page; or the current energy level of the wireless device; or the first energy harvesting rate of the wireless device; or a current energy harvesting rate of the wireless device; or the energy harvesting schedule of the wireless device.

7. The core node of claim 1, wherein implicitly determining that the wireless device has exited from the powered-down state includes estimating a second time when a current energy level of the wireless device will rise above the second energy threshold, the estimating being based on:

the current energy level of the wireless device; or the first energy harvesting rate of the wireless device; or a current energy harvesting rate of the wireless device; or the energy harvesting schedule of the wireless device.

8. The core node of claim 1, wherein the paging procedure is a legacy paging procedure.

9. The core node of claim 1, wherein the first indication is received via non-access stratum, NAS, signaling, from the wireless device or via signaling from the network node.

10. A method implemented in a core node for communication with a wireless device and a network node, the method comprising:

receiving a first indication that the wireless device is an energy harvesting device, the first indication indicating:

a first energy threshold associated with the wireless device entering a powered-down state; or a second energy threshold associated with the wireless device exiting the powered-down state; or an energy harvesting schedule of the wireless device; or a first energy harvesting rate of the wireless device, the first energy harvesting rate being:

an average energy harvesting rate; or a predicted energy harvesting rate; or a historical energy harvesting rate; and modifying a network procedure based at least on the first indication, the modifying the network procedure comprising:

implicitly determining that the wireless device has entered into the powered-down state;

pausing a paging procedure based on the implicit determination that the wireless device has entered into the powered-down state;

implicitly determining that the wireless device has exited from the powered-down state; and resuming the paging procedure based on the implicit determination that the wireless device has exited from the powered-down state.

11. A network node for communication with a core node and a wireless device, the network node comprising processing circuitry configured to:

receive information from the wireless device indicating that the wireless device is an energy harvesting device;

cause transmission of a first indication to the core node, the first indication being based on the received information and configured to cause the core node to modify a network procedure;

receive a first instruction from the core node, the first instruction being based on the modified network procedure and the first indication, the first instruction configured to cause the network node to pause a paging procedure associated with the wireless device at a first time;

implement the first instruction;

receive a second instruction from the core node, the second instruction being based on the modified network procedure and the first indication and/or a second indication; and implement the second instruction, the second instruction being configured to cause the network node to resume the paging procedure at a second time based on the first indication and/or the second indication indicating a time to reach the second energy threshold being less than a difference between the second time and the first time.

12. The network node of claim 11, wherein the modifying of the network procedure includes:

buffering downlink data until activity is detected from the wireless device; or modifying a paging procedure used to page the wireless device.

13. The network node of claim 12, wherein the network procedure is a core node procedure or a network node procedure.

14. The network node of claim 12, wherein the first indication indicates at least one of:

a first energy threshold associated with the wireless device entering a powered-down state; or a second energy threshold associated with the wireless device exiting the powered-down state; or an energy harvesting schedule of the wireless device; and a first energy harvesting rate of the wireless device, the first energy harvesting rate being at least one of:

an average energy harvesting rate; or a predicted energy harvesting rate; or a historical energy harvesting rate.

15. The network node of claim 14, wherein the processing circuitry is further configured to:

receive additional information from the wireless device indicating:

a current energy level of the wireless device; or a current energy harvesting rate; or a first expected time to reach the first energy threshold; or a second expected time to reach the second energy threshold; and cause a transmission of the second indication to the core node, the second indication being based on the received additional information, the first instruction being further based on the second indication.

16. A method implemented in a network node for communication with a core node and a wireless device, the method comprising:

receiving information from the wireless device indicating that the wireless device is an energy harvesting device;

causing transmission of a first indication to the core node, the first indication being based on the received information and configured to cause the core node to modify a network procedure;

receiving a first instruction from the core node, the first instruction being based on the modified network procedure and the first indication, the first instruction configured to cause the network node to pause a paging procedure associated with the wireless device at a first time;

implementing the first instruction;

receiving a second instruction from the core node, the second instruction being based on the modified network procedure and the first indication and/or a second indication; and implementing the second instruction, the second instruction being configured to cause the network node to resume the paging procedure at a second time based on the first indication and/or the second indication indicating a time to reach the second energy threshold being less than a difference between the second time and the first time.

* * * * *